United States Patent [19]

Menschner et al.

[11] Patent Number: 4,501,778

[45] Date of Patent: Feb. 26, 1985

[54] METAL EFFECT GLAZES FOR CERAMIC BASES

[75] Inventors: Rolf Menschner, Frankfurt; Robert Fischer, Obertshausen, both of Fed. Rep. of Germany

[73] Assignee: Degussa Aktiengesellschaft, Frankfurt am Main, Fed. Rep. of Germany

[21] Appl. No.: 607,132

[22] Filed: May 4, 1984

[30] Foreign Application Priority Data

May 6, 1983 [DE] Fed. Rep. of Germany ....... 3316596

[51] Int. Cl.³ ............................................. B05D 3/02
[52] U.S. Cl. .............................. 427/376.2; 106/286.2; 106/286.4; 106/286.5; 106/286.7; 501/16; 501/17; 501/18; 427/397.7; 428/428

[58] Field of Search ............... 106/286.2, 286.4, 286.5, 106/286.7; 501/16, 17, 18; 427/376.2, 397.7; 428/428

[56] References Cited

U.S. PATENT DOCUMENTS

| | | | |
|---|---|---|---|
| 4,008,091 | 2/1977 | Wagner et al. | 501/16 |
| 4,221,824 | 9/1980 | Leonard et al. | 427/376.2 |
| 4,331,768 | 5/1982 | Boyd et al. | 501/18 |

*Primary Examiner*—Lorenzo B. Hayes
*Attorney, Agent, or Firm*—Cushman, Darby & Cushman

[57] ABSTRACT

There are obtained metal effect glazes having broad displays of colors, which also can be employed for rapid firing conditions by treating 75–95% of a base glaze made of 20–55% PbO, 0.1–10% $Na_2O$, 1–15% CaO, 1–18% $Al_2O_3$, and 8–81% $SiO_2$ with 5–25% of a color body made of 10–80% $MnO_2$, 1–20% Cu, 0.1–50% $TiO_2$, and 0.01–20% NiO.

8 Claims, No Drawings

METAL EFFECT GLAZES FOR CERAMIC BASES

BACKGROUND OF THE INVENTION

The invention is directed to metal effect glazes for ceramic supports consisting of (or consisting essentially of) 75 to 95% base glaze and 5-25% color body.

For thousands of years ceramic surfaces have been decorated and protected by glazes. Fashion and technological advance have caused a continuous adjustment of the glazes to the customs of users. Thus the imitation of metal surfaces in the ceramic area depends ultimately on joining the sought for advantages of ceramics with appearance of metals.

In this area of the so-called metal effect glazes there are known glazes containing iron oxide containing glazes under the name "Aventurin" glazes. Thereby the colors are produced through hematite platelets in order to imitate copper. The variation possibilities for other color tones are very small.

Therefore, it was the problem of the present invention to develop metal effect glazes for ceramic supports consisting of (or consisting essentially of) 75-95% base glaze and 5-25% color body which permit the imitation of metal effects with a wide display of color which also are usable for rapid firing (or baking) conditions in the earthenware and stoneware area.

SUMMARY OF THE INVENTION

This problem was solved according to the invention by having the base glaze consist of (or consist essentially of) the composition 20-55% PbO; 0.1-10% Na$_2$O; 1-15% CaO; 1-18% Al$_2$O$_3$ and 8-81% SiO$_2$ and the color body consist of (or consist essentially of) oxides of the composition 30-80% MnO$_2$; 1-20% CuO; 0.1-50% TiO$_2$; and 0.01-20% NiO.

Hereby the color body can consist of a loose mixture of the oxides or of an oxide mixture sintered together. Preferably there is used 88-92% of a base glaze made of 23.9-51.7% PbO; 0.2-5.6% Na$_2$O; 3.8-9.8% CaO; 4.0-17.0% Al$_2$O$_3$; and 19.8-75.9% SiO$_2$ and there is added to this 8-12% of a color body having the composition 50-72% MnO$_2$; 2-10% CuO; 16-40% TiO$_2$; and 5-10% NiO.

Base glazes with these compositions, as is generally the custom, composed of frits and raw materials. The amount and type of the individual components on the one hand determine the appearance of the glaze surface and on the other hand the firing or baking temperature. Lower firing temperatures require more PbO which can be replaced by alkali aluminum silicate at higher firing temperatures.

In place of CaO there can also be added partially BaO or SrO to vary the glaze surfaces. With an increase of the Al$_2$O$_3$ content there is obtained a matting of the surface.

The color body for the development of the metal effect is a mixture of four oxides, namely CuO, MnO$_2$, TiO$_2$ and NiO. The amount of each of the individual components thereby must stand in a specific ratio to each other and to the base glaze.

The color of the glaze is changed by variation of the proportions of the stated oxides and to each other.

Unless otherwise indicated all parts are by weight.

DETAILED DESCRIPTION

| Color | MnO$_2$ | TiO$_2$ | CuO | NiO |
| --- | --- | --- | --- | --- |
| blue-gold | 72 | 16 | 2 | 10 |
| red-gold | 68 | 16 | 6 | 10 |
| yellow-gold | 60 | 20 | 10 | 10 |
| platinum | 50 | 40 | 5 | 5 |

It should be understood that these ratios can be varied further for the production of nuances. It is likewise possible to add still other metals and metal oxides, such as e.g. Fe$_2$O$_3$, MoO, Bi$_2$O$_3$, Sb$_2$O$_3$, CoO, V$_2$O$_5$, ZrO$_2$, Cr$_2$O$_3$ to change the character of the glaze.

The metal effect glazes of the invention can be applied by various application techniques, such as spraying, pouring on, and screen printing.

The firing temperature is between 950° and 1300° C. depending on the composition of the base glaze. For lower temperatures, e.g., more frit is necessary. This can be replaced in the stated mix by ceramic raw materials at higher temperatures. The preferred firing range is between 1,020° and 1,280° C.

The glaze baking can be carried out either as a long time or as a rapid baking in neutral to oxidizing atmosphere.

The entire disclosure of German priority application P 3316596.3 is hereby incorporated by reference.

What is claimed is:

1. A metal effect glaze composition suitable for applying to a ceramic base consisting essentially of 75-95 of base glaze and 5-25 color body, the base glaze composition consisting essentially of 20-55% PbO, 0.1-10% Na$_2$O, 1-15% CaO, 1-18% Al$_2$O$_3$, and 8-81% SiO$_2$ and the color body being made of oxides having a composition consisting essentially of 30-80% MnO$_2$, 1-20% CuO, 0.1-50% TiO$_2$, and 0.01-20% NiO.

2. A ceramic support coated with the glaze of claim 1.

3. A metal effect glaze composition according to claim 1 consisting essentially of 88-92% base glaze and 8-12% color body, the base glaze having a composition consisting essentially of 23.9-51.7% PbO, 0.2-5.6% Na$_2$O, 3.8-9.8% CaO, 4.0-17.0% Al$_2$O$_3$, and 19.8-75.9% SiO$_2$ and the color body consisting essentially of oxides having the composition 50-72% MnO$_2$, 2-10% CuO, 16-40% TiO$_2$, and 5-10% NiO.

4. A ceramic support coated with the glaze of claim 3.

5. A method of imparting a metal effect glaze to the surface of a ceramic support comprising applying the metal effect glaze composition of claim 3 to the ceramic support and firing the support at a temperature range of 950° to 1,300° C.

6. A method of imparting a metal effect glaze to the surface of a ceramic support comprising applying the metal effect glaze composition of claim 1 to the ceramic support and firing the support at a temperature range of 950° to 1,300° C.

7. A method of imparting a metal effect glaze to the surface of a ceramic support comprising applying the metal effect glaze composition of claim 3 to the ceramic support and firing the support at a temperature range of 1,020° to 1,280° C.

8. A method of imparting a metal effect glaze to the surface of a ceramic support comprising applying the metal effect glase composition of claim 1 to the ceramic support and firing the support at a temperature range of 1,020° to 1,280° C.

* * * * *